US006974170B2

(12) United States Patent  (10) Patent No.: US 6,974,170 B2
Mulvihill  (45) Date of Patent: Dec. 13, 2005

(54) SLIDE OUT TRUNK SPACE STORAGE SYSTEM

(75) Inventor: James A. Mulvihill, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/748,529

(22) Filed: Dec. 30, 2003

(65) Prior Publication Data

US 2005/0140156 A1 Jun. 30, 2005

(51) Int. Cl.$^7$ ................................................ B60N 3/00
(52) U.S. Cl. ................. 296/24.4; 296/39.2; 224/42.33; 224/526; 410/130
(58) Field of Search .................... 296/24.4, 37.1, 296/37.16, 37.6, 37.8, 124, 37.2, 37.5; 224/42.32, 224/42.33, 403, 522–526, 542, 925, 539, 224/404, 42.34, 311, 401; 410/117, 118, 410/129, 130, 135, 139

(56) References Cited

U.S. PATENT DOCUMENTS

| | | | | |
|---|---|---|---|---|
| 2,091,070 A | * | 8/1937 | Girl | 414/462 |
| 2,953,287 A | * | 9/1960 | Werner | 224/496 |
| 3,865,049 A | * | 2/1975 | Hassellof et al. | 410/156 |
| 3,866,544 A | * | 2/1975 | Rothell | 410/129 |
| 4,185,799 A | * | 1/1980 | Richards, Jr. | 244/118.5 |
| 4,278,376 A | * | 7/1981 | Hunter | 410/130 |
| 4,681,360 A | * | 7/1987 | Peters et al. | 296/37.6 |
| 4,717,298 A | * | 1/1988 | Bott | 410/129 |
| 4,752,095 A | * | 6/1988 | Brady | 296/37.6 |
| 4,887,947 A | * | 12/1989 | Bott | 296/39.2 |
| 4,955,771 A | * | 9/1990 | Bott | 410/94 |
| 4,958,876 A | * | 9/1990 | Diaco et al. | 296/39.2 |
| 4,969,784 A | * | 11/1990 | Yanke | 410/150 |
| 5,035,184 A | * | 7/1991 | Bott | 104/121 |
| 5,090,763 A | * | 2/1992 | Kremer et al. | 296/39.2 |
| 5,161,700 A | * | 11/1992 | Stannis et al. | 211/175 |
| 5,167,433 A | * | 12/1992 | Ryan | 296/37.1 |
| 5,167,434 A | * | 12/1992 | Bott | 296/39.2 |
| 5,240,301 A | * | 8/1993 | Arnold | 296/39.2 |
| 5,259,712 A | * | 11/1993 | Wayne | 410/152 |
| 5,340,183 A | * | 8/1994 | Horian | 296/24.4 |
| 5,368,210 A | | 11/1994 | Wotring | 224/404 |
| 5,392,972 A | * | 2/1995 | Caruso et al. | 224/42.34 |
| 5,415,506 A | * | 5/1995 | Payne | 296/39.2 |
| 5,419,603 A | * | 5/1995 | Kremer et al. | 296/39.2 |
| 5,427,486 A | * | 6/1995 | Green | 410/118 |
| 5,562,321 A | * | 10/1996 | VanHoose | 296/37.16 |
| 5,586,850 A | * | 12/1996 | Johnson | 410/138 |
| 5,597,193 A | * | 1/1997 | Conner | 296/39.2 |
| 5,669,537 A | * | 9/1997 | Saleem et al. | 224/539 |
| 5,685,470 A | | 11/1997 | Moore | 224/567 |
| 5,685,893 A | * | 11/1997 | Field et al. | 75/772 |
| 5,715,978 A | * | 2/1998 | Ackeret | 224/42.33 |
| 5,720,507 A | * | 2/1998 | Emery | 296/39.2 |
| 5,800,145 A | * | 9/1998 | Kelce | 410/142 |
| 5,871,316 A | * | 2/1999 | Bills | 410/42 |

(Continued)

Primary Examiner—Kiran B. Patel
(74) Attorney, Agent, or Firm—Bill Panagos

(57) ABSTRACT

A trunk space storage system for motor vehicles comprising a movable wall. This movable wall is located on the floor of the trunk space and acts as a new back wall of the trunk space. This movable wall slides along tracks on the floor of the trunk space to a position the user desires. The movable wall further comprises a wall extension to increase the wall height. This invention allows users to utilize as much of the trunk space as necessary without having the problem of having objects roll into the deep trunk space which can be difficult for many people to access.

15 Claims, 1 Drawing Sheet

U.S. PATENT DOCUMENTS

| | | | | |
|---|---|---|---|---|
| 5,927,787 A | * | 7/1999 | Emery et al. | 296/39.2 |
| 5,961,171 A | * | 10/1999 | Iijima | 296/37.1 |
| 6,015,178 A | * | 1/2000 | Haack | 296/39.2 |
| 6,053,553 A | * | 4/2000 | Hespelt | 296/37.1 |
| 6,109,847 A | * | 8/2000 | Patel et al. | 410/129 |
| 6,170,897 B1 | * | 1/2001 | Karrer | 296/39.2 |
| 6,439,633 B2 | * | 8/2002 | Nemoto | 296/37.14 |
| 6,460,912 B2 | * | 10/2002 | Moore et al. | 296/24.43 |
| 6,516,983 B2 | * | 2/2003 | Sotiroff et al. | 224/281 |
| 6,524,043 B2 | * | 2/2003 | Earle et al. | 410/130 |
| 6,547,298 B2 | * | 4/2003 | Sotiroff et al. | 296/24.43 |
| 6,601,899 B2 | * | 8/2003 | Kiester et al. | 296/39.2 |
| 6,629,807 B2 | * | 10/2003 | Bernardo | 410/130 |
| 6,688,821 B1 | * | 2/2004 | Snyder | 410/140 |
| 6,719,347 B2 | * | 4/2004 | Gehring et al. | 296/37.5 |
| 6,827,385 B2 | * | 12/2004 | Mobley | 296/37.6 |
| 6,827,533 B2 | * | 12/2004 | Cano-Rodriguez et al. | 410/128 |
| 2003/0034664 A1 | * | 2/2003 | Wayne | 296/39.2 |

* cited by examiner

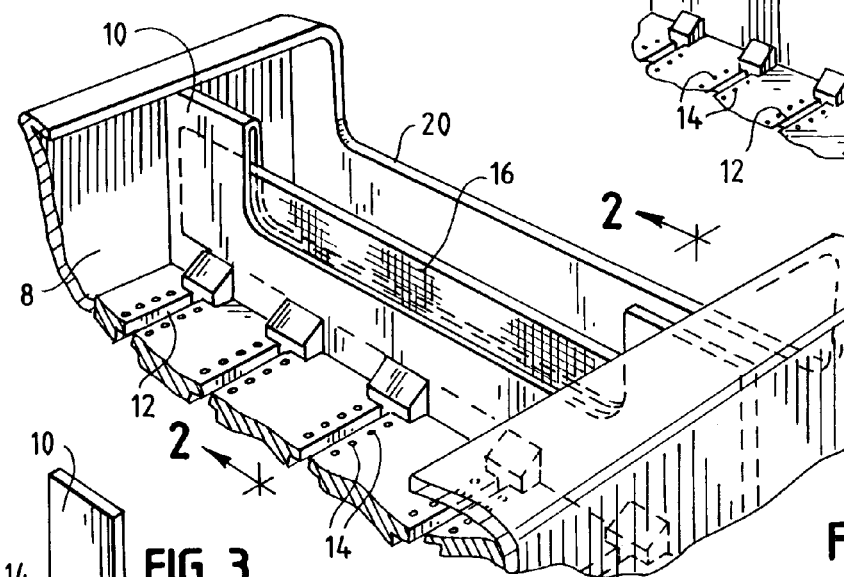
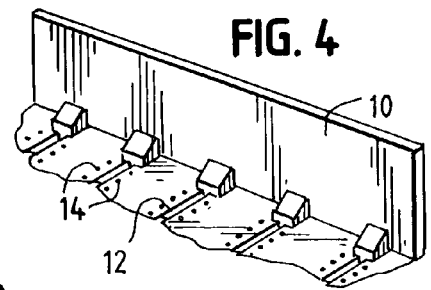
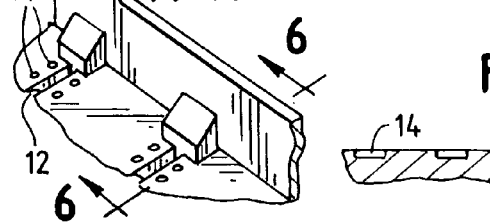
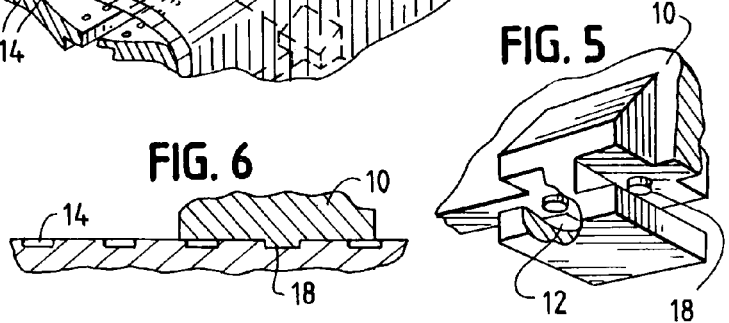
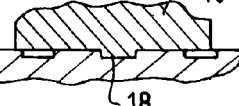
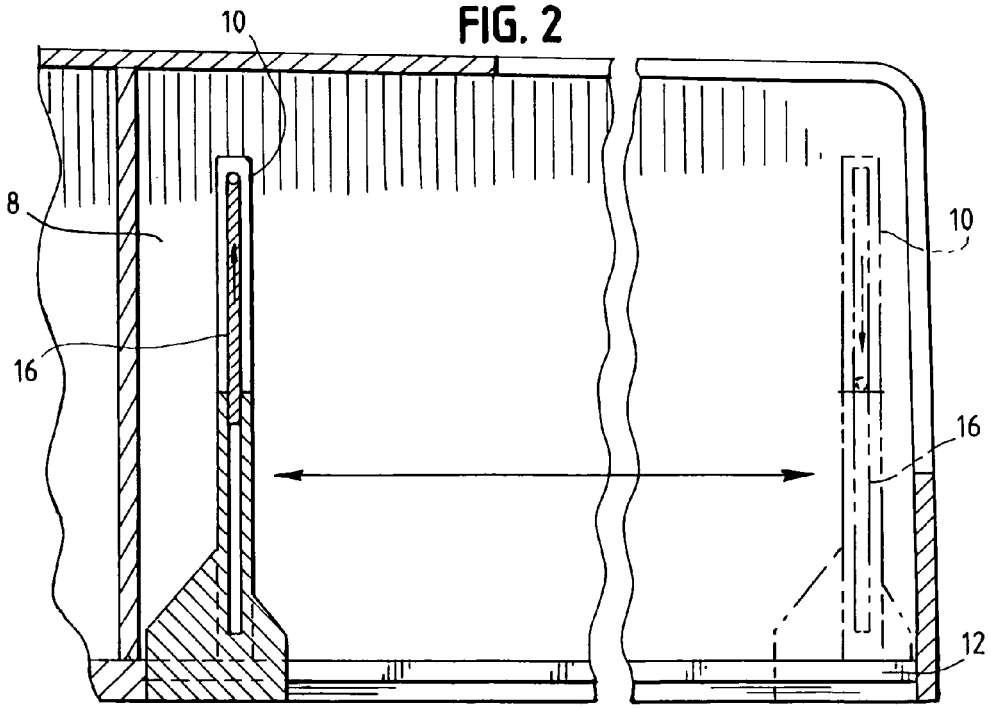

SLIDE OUT TRUNK SPACE STORAGE SYSTEM

FIELD OF INVENTION

This invention relates to the trunk space of a motor vehicle. More specifically, it relates to organization or storage of objects within that trunk space.

BACKGROUND OF INVENTION

In motor vehicles, the trunk space is the place where drivers and their passengers store personal belongings so that the passenger area of the motor vehicle can be used more comfortably. As a result, there is a high demand for more trunk space in motor vehicles. Many manufacturers have met this demand by making trunk space deeper into the motor vehicle. Many drivers and their passengers have enjoyed this deeper trunk space with no problems. However, some drivers and/or passengers are either elderly or have certain physical limitations that make it difficult for them to bend that far over to reach into the now deeper trunk space. Even if those users do not specifically place an object within the deep trunk space, there is still a chance that the object will roll back into that space during travel thereby making it extremely difficult for the user to retrieve the object from the back of the deep trunk space. As a result, there has been a demand to help solve this problem.

In the past, these problems have been solved by using netting suspended as a sort of wall in the vehicle to help control objects in the trunk space. However, there still are problems with the prior art in that it does not adequately address the problem that many people face when they cannot reach into their deep trunk space. U.S. Pat. No. 5,247,486 address a system with a kind of adjustable wall. However, this system seems best suited for a pick-up trunk style of vehicle and may not work best in a trunk for a sedan style vehicle. Additionally, the system in the '486 patent requires the user to maneuver in various position to adjust the wall. U.S. Pat. No. 5,386,210 addresses a storage system that slides along the walls of a flat-bed pick-up trunk. While this storage system may be easy to use for those users with physical impairments, it is not suited for the trunk space of a car. This system is best suited for a pick-up trunk style vehicle. U.S. Pat. No. 5,685,470 discloses a trunk storage system that can utilize a wall-like position if the user so desires. However, the user must manipulate the wall into such a position. It is not easy to use for those who may need some assistance.

This invention solves the above-mentioned problems by utilizing a moveable wall that can be activated to any number of position along the trunk space floor thereby acting as a new back trunk wall to allow the user to use the trunk in a more desired position and eliminating the problem of having to bend into deep trunk space. The objects are then secure and are prevented from rolling into the deep trunk space. This invention does not require users to maneuver into varying positions that may be difficult for them to obtain due to physical limitations. This trunk space storage system slides easily along the floor of the trunk space allowing the user to position it in any desired location with little or no effort.

SUMMARY OF INVENTION

This invention relates to a trunk space storage system comprising a movable wall. This movable wall is located on the floor of the trunk space and moves along tracks on the floor of trunk space to achieve desired location. The tracks further comprise indents to assist in securing the movable wall in its desired position.

Another aspect of this invention is a trunk space storage system comprising movable wall and a wall extension. The wall extension extends the height of the movable wall to the height desired by a user, but only as high as the highest point of the movable wall. This wall extension further comprises a rigid, semi-rigid, or a soft, flexible material.

DETAILED DESCRIPTION OF THE DRAWINGS

FIG. 1 is a view of an embodiment of the movable wall in the trunk space of the motor vehicle.

FIG. 2 is a cross-sectional view of the movable wall and the positions it can be moved to.

FIG. 3 is a view of an embodiment of the movable wall, namely that it does not contain the wall extension.

FIG. 4 is a view of another embodiment of the moveable wall, namely that it does not have the cutout; the movable wall does not mimic the shape of the trunk space opening.

FIG. 5 is a detailed view of the movable wall on its track with the bosses exposed.

FIG. 6 is a cross-sectional view of the movable wall on its track with indents.

DETAILED DESCRIPTION OF THE PREFERRED EMBODIMENT

In its preferred embodiment, this invention will be used in a motor vehicle, preferably one with a deep trunk space 8. In one of the preferred embodiments, this trunk space storage system comprises a movable wall 10. This movable wall 10 can be located anywhere in the trunk space 8 so long as it is positioned in a place that allows for sliding movement. Preferably, this movable wall 10 will be located on the floor of the trunk space 8 and will serve the use of being the back wall for the trunk space 8. In one embodiment, this movable wall 10 will mimic the shape of the trunk opening 20, seen in FIG. 1 and FIG. 3. In another embodiment, the movable wall 10 will more closely mimic the back wall of the trunk space 8, as seen in FIG. 4. The floor of the trunk space 8 has tracks 12 in which the movable wall 10 slides.

The movable wall 10 slides along the tracks 12 to any position the user desires. The wall will allow the user to utilize all of the trunk space 8 within the motor vehicle or only a small portion of it. The movable wall 10 will have a snug fit within the tracks 12. This snug fit allows the movable wall 10 to utilize friction to stay in desired positions along the tracks 12. While the fit of the movable wall 10 into the tracks 12 is snug, it still slides easily enough that those with physical limitations will still be able to use it with little strain. The tracks 12 further comprise indents 14 in various positions along the tracks to assist in supporting the position of the movable wall 10, as seem in FIG. 5 and FIG. 6. The moveable wall 10 further comprises bosses 18 that fit into the indents 14 of the tracks 12.

In one of the preferred embodiments, seen in FIG. 1, this trunk space storage system comprises a movable wall 10 (as described above) and a wall extension 16. This wall extension 16 further comprises a rigid or semi-rigid material such as plastic, or a soft, flexible material, such as fabric or netting. The wall extension 16 allows the user of this invention to raise or lower the height of the movable wall 10 to a height that is most desired for containment of the objects placed in the trunk space 8. However, in its preferred embodiment, the wall extension 16 can only be raised as high as the highest point of the movable wall. A user will pull upwards on the wall extension 16 to increase height of wall extension 16. If a user does not need the wall extension 16, then it is simply pushed down into a stowed position.

This wall extension 16 can be useful for times when the objects placed in the trunk space 8 are slightly tall and unsteady. This wall extension 16 simply prevents the objects from falling over the moveable wall 10 and into the deep trunk space 8. Having the wall extension 16 is also useful for times when a user has oddly shaped objects. Perhaps a user has an object does not need to use an increase movable wall 10 height but still needs to use the movable wall 10 so that they do not have to bend into the deep trunk space 8. An oddly shaped object can then be placed against the movable wall 10 and can overhang the wall if necessary if the wall extension 16 is stowed. Having a wall extension 16 allows the user more versatility in using this invention.

The wall extension 16 as seen in FIG. 1 is not necessary in all embodiments. FIG. 3 and FIG. 4 depict other alternatives for the movable wall 10. The choice of movable wall 10 depends on the consumer desires. FIG. 3 depicts a movable wall 10 without a wall extension 16. It simply is the movable wall 10 as it mimics the trunk space opening 20. FIG. 4 simply depicts a movable wall 10 with no cutout. Instead of mimicking the trunk space opening 20, it more closely resembles the look of the back wall to the trunk space (not shown).

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. A trunk space storage system comprising:
   at least one track mounted in the trunk space; and
   a movable wall disposed in a generally perpendicular position in relation to said track, substantially inhibited from movement away from the perpendicular position, supported for sliding movement along said track in the trunk space, and held in position along said track via friction.

2. The trunk space storage system as in claim 1, wherein there are numerous tracks mounted in the trunk space in which said movable wall slides.

3. The trunk space storage system as in claim 1, wherein said track further comprises at least one indent.

4. The trunk space storage system as in claim 3, wherein said movable wall further comprises at least one boss to fit into said indent to assist in supporting the position of said movable wall.

5. The trunk space storage system of claim 1, wherein abutment between said movable wall and said track inhibits said movable wall from movement away from the perpendicular position.

6. The trunk space storage system of claim 1, wherein said movable wall includes a cutout such that said movable wall mimics an opening of the trunk space.

7. A trunk space storage system comprising:
   at least one track mounted in the trunk space;
   a movable wall disposed in a generally perpendicular position in relation to said track in the trunk space, substantially inhibited from movement away from the perpendicular position, and supported for sliding movement by said track; and
   a wall extension supported for movement relative to said movable wall and adapted for adjusting the height of said movable wall.

8. The trunk space storage system as in claim 7, wherein there are numerous tracks mounted in the trunk space in which said moveable wall slides.

9. The trunk space storage system of claim 7, wherein said track further comprises at least one indent.

10. The trunk space storage system of claim 9, wherein said movable wall further comprises at least one boss to fit into said indent to hold said movable wall in desired position.

11. The trunk space storage system of claim 7 wherein said wall extension extends only as high as highest point of said movable wall.

12. The trunk space storage system of claim 7, wherein said wall extension further comprises a rigid, semi-rigid, or a soft, flexible material.

13. The trunk space storage system of claim 7, wherein abutment between said movable wall and said track inhibits said movable wall from movement away from the perpendicular position.

14. The trunk space storage system of claim 7, wherein said movable wall includes a cutout such that said movable wall mimics an opening of the trunk space.

15. The trunk space storage system of claim 14, wherein said wall extension is supported by said movable wall and is adapted for adjusting the height of said movable wall at said cutout.

* * * * *